(No Model.)
G. D. BURTON.
SYSTEM OF DISTRIBUTION OF ELECTRICAL HEATING CURRENTS.
No. 468,938. Patented Feb. 16, 1892.
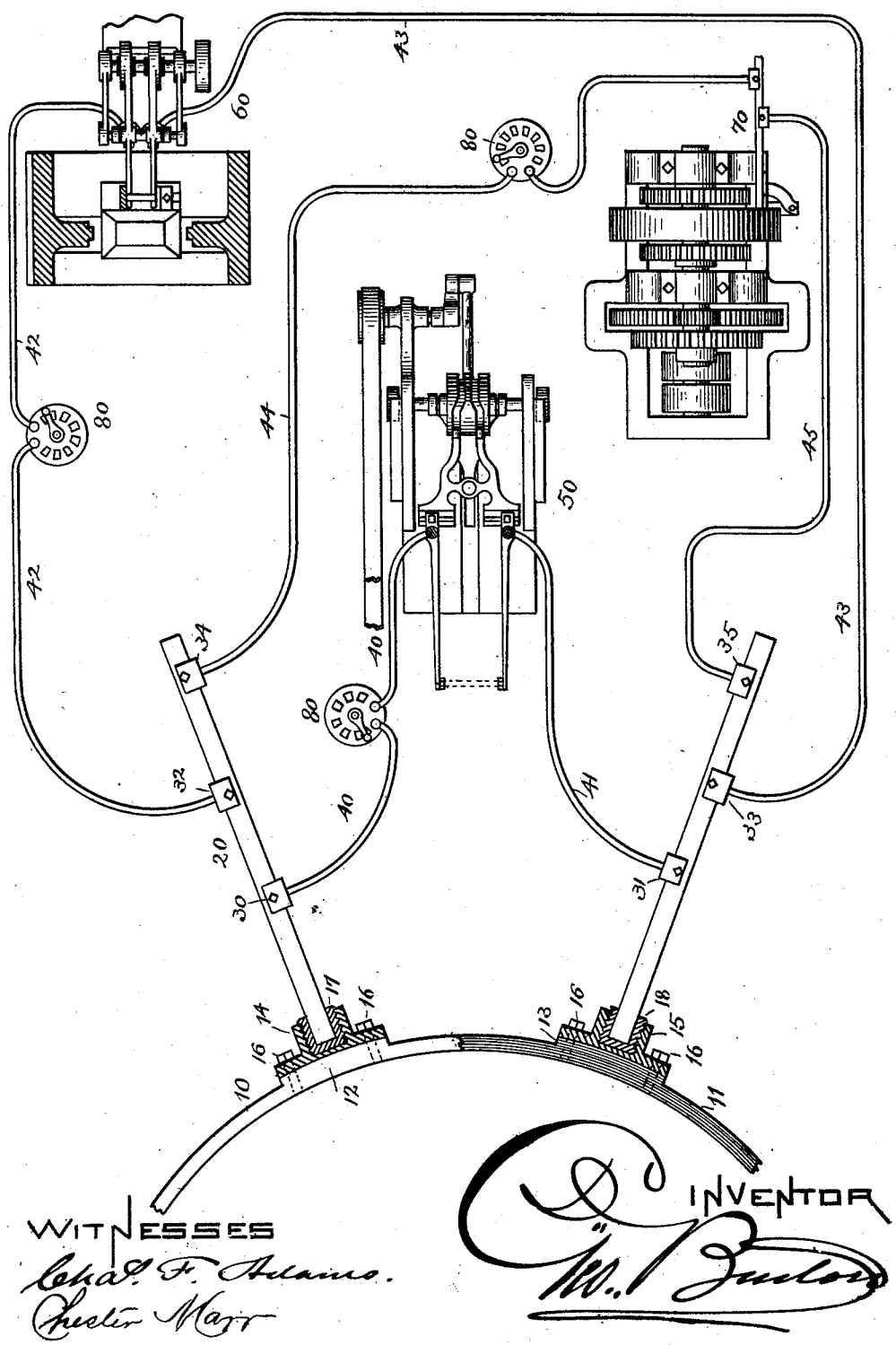

UNITED STATES PATENT OFFICE.

GEORGE D. BURTON, OF BOSTON, MASSACHUSETTS, ASSIGNOR TO THE ELECTRICAL FORGING COMPANY, OF MAINE.

SYSTEM OF DISTRIBUTION OF ELECTRICAL HEATING-CURRENTS.

SPECIFICATION forming part of Letters Patent No. 468,938, dated February 16, 1892.

Application filed May 14, 1891. Serial No. 392,706. (No model.)

*To all whom it may concern:*

Be it known that I, GEORGE DEXTER BURTON, a citizen of the United States, residing at Boston, in the county of Suffolk and State of Massachusetts, United States of America, have invented certain new and useful Improvements in Systems of Electrical Distribution of Heating-Currents, of which the following is a specification.

The object of this invention is to distribute heating-currents of electricity of different volumes for heating metals for forging or other purposes.

The drawing represents a plan of an apparatus embodying this improved system of electrical distribution.

The positive ring 10 and negative ring 11 of an electric-current converter are disposed in different planes, one above the other. This converter is connected in any suitable manner with a suitable source of electricity, such as an alternating-current dynamo, from which it receives the current to be converted. These rings are composed of copper or other suitable conductive material and provided with adjustable sockets 17 and 18, screw-threaded on their exterior to fit the sockets 14 and 15. Conducting-rods 20 and 21, composed of copper or other suitable material, are inserted at their inner ends in the adjustable sockets 17 and 18. Adjustable clamps 30 and 31, composed of conducting material, are adjustable on the conductors 20 and 21, and wires or cables 40 and 41, connected with said clamps, serve to conduct the current to an electric heater 50. Similar adjustable clamps 32 and 33 are also disposed on said rods 20 and 21, and conductors 42 and 43 connect said clamps 32 and 33 with another electric heater 60, which latter heater is represented in connection with a drop-forging machine. Adjustable clamps 34 and 35 are also disposed on the conducting-rods 20 and 21, and electric conductors or cables 44 and 45 connect said clamps with another electric heater 70, which is represented in the drawings in connection with a roll-forging machine. Rheostats 80 are interposed in the branch circuits leading to the different machines or heaters.

The thimbles 17 and 18 may be removed, and similar thimbles having different diameters adapted to conducting-rods of different sizes may be inserted.

This apparatus enables the electric current to be distributed to different machines and regulated to suit the requirements of each.

I claim as my invention—

1. In an apparatus for distributing electric currents for heating purposes, the combination of an electric converter, conducting-rods extending therefrom, adjustable clamps on said conducting-rods, conductors leading from said clamps to different electric heaters, and rheostats disposed in the branch circuit of each heater.

2. In an apparatus for distributing electric currents for heating purposes, the combination of converter-rings provided with fixed sockets, adjustable sockets in said fixed sockets, and conducting-rods extending from said adjustable sockets.

GEO. D. BURTON.

Witnesses:
CHESTER MARR,
F. C. SOMES.